United States Patent [19]

DeHart

[11] 4,417,712

[45] Nov. 29, 1983

[54] WALL BRACKET CONSTRUCTION

[76] Inventor: Damon H. DeHart, 31 Avon St., Wakefield, Mass. 01880

[21] Appl. No.: 204,306

[22] Filed: Nov. 5, 1980

[51] Int. Cl.³ .................................................. F16B 5/06

[52] U.S. Cl. .............................. 248/225.2; 248/227.1; 248/304

[58] Field of Search ..................... 248/225.2, 215, 227, 248/217.1, 217.2, 217.3, 217.4, 301, 304, 251, 260, 265, 272

[56] References Cited

U.S. PATENT DOCUMENTS 275,481 4/1883 Gould ................................ 248/265
568,628 9/1896 Reubel ................................ 248/265
585,471 6/1897 Hannegan ........................... 248/260
1,025,920 5/1912 Meek .................................. 248/260
3,199,823 8/1965 Stall ..................................... 248/265
4,039,136 8/1977 DeHart .............................. 248/215
4,179,091 12/1979 Bidney ............................... 248/265
4,322,050 3/1982 Roach ............................. 248/265 X

*Primary Examiner*—William H. Schultz
*Assistant Examiner*—Ramon O. Ramirez

[57] ABSTRACT

Disclosed herein is a wall bracket construction for suspending articles therefrom and which bracket construction is adapted for mounting, without the aid of fasteners, to wall moldings of differing thicknesses.

11 Claims, 4 Drawing Figures

WALL BRACKET CONSTRUCTION

BACKGROUND OF THE INVENTION

The present invention relates generally to wall brackets from which various articles may be suspended and is more particularly concerned with a wall bracket construction adapted for mounting to an essentially horizontally disposed wall molding.

In my prior patent, U.S. Pat. No. 4,039,136, of Aug. 2, 1977, there is disclosed a wall bracket construction capable of being mounted directly to a wall through the agency of conventional fasteners or, alternatively, to a wall molding without the use of fasteners. With respect to the latter mounting scheme said construction comprises an elongated bracket means having one end portion displaced outwardly from the other end portion, said one end portion defining a loop for suspending an article therefrom. The other end portion of the bracket means defines a straight section depending from the one end portion. The second element of the construction comprises a thin bodied tang having a depending tang element adapted for insertion between a wall and a wall molding, a horizontal middle portion acting to space the depending section of the bracket means from the tang element and thereby provide the clearance necessary to allow the wall molding to nest therebetween, and a third portion extending from the end of said middle portion. The bracket construction is completed by the third element, a retainer collar, which receives the depending straight section of the bracket means and the third portion of the tang and maintains these elements in engagement.

While the wall bracket construction disclosed in U.S. Pat. No. 4,039,136 has been found entirely useful for the purposes set forth therefor, it does suffer from the absence of suitable means by which the spacing between the tang element and the depending straight section of the bracket means can be altered in order to accomodate wall moldings of different thicknesses. Thus, unless the horizontal middle portion of the tang happens, through serendipity or design, to be of the correct length for the wall molding thickness of a particular proposed installation, the spacing between the tang element and the depending section of the bracket means will often be found to be incrorrect and installation difficulties can be experienced. In accordance with the present invention, however, this problem has been solved.

It is a principal object of the present invention to provide a novel wall bracket construction adapted for mounting, with a nicety of fit, to wall moldings of various thicknesses.

It is another object of the invention to provide a wall bracket construction of the foregoing type wherein the forces acting upon the assembled and mounted construction, upon suspension of an article therefrom, serve to increase the security of the mounting arrangement.

Other objects and advantages of the present invention will in part be obvious and will in part appear hereinafter.

SUMMARY OF THE INVENTION

The wall bracket construction of the invention broadly comprises a bracket element, a tang element and a linking element. The bracket element is elongate and comprises an upper end portion displaced outwardly from the bottom end portion thereof, said upper end portion defining a hook for suspending an article therefrom. The tang element of the construction comprises a vertical, downwardly oriented tang member of sufficient thinness for insertion thereof between a wall and a wall molding and a transverse member extending from the upper end of said tang member. The link element of the construction comprises another transverse member, the outboard end of which member comprises means for fixation thereof to the depending bottom end portion of said bracket element. One of the transverse members of the tang element or link element comprises a plurality of spaced apart apertures along at least a portion of the length thereof. The other transverse member comprises an upwardly turned projection adapted to engage any of said apertures of the one transverse member in interlocking relationship therewith.

THE DRAWING

FIG. 1 hereof is a schematic, diagrammatic, partially sectional, perspective view of one embodiment of the wall bracket construction of the invention shown mounted to a wall molding.

FIG. 2 hereof is a schematic, diagrammatic, exploded perspective view of alternative embodiments of the tang and link elements utilized in the FIG. 1 construction.

FIG. 3 hereof is a schematic, diagrammatic, perspective view of another embodiment of the invention disclosing an alternative form of bracket element and an alternative means by which the outboard end of the link element of the construction is affixed to the lower end portion of said bracket element.

FIG. 4 hereof is a schematic, diagrammatic perspective view of yet another embodiment of the invention disclosing alternative means for fixation of the outboard end of the link element of the construction to the lower end portion of the bracket element.

DESCRIPTION OF PREFERRED EMBODIMENTS

Figure 1:
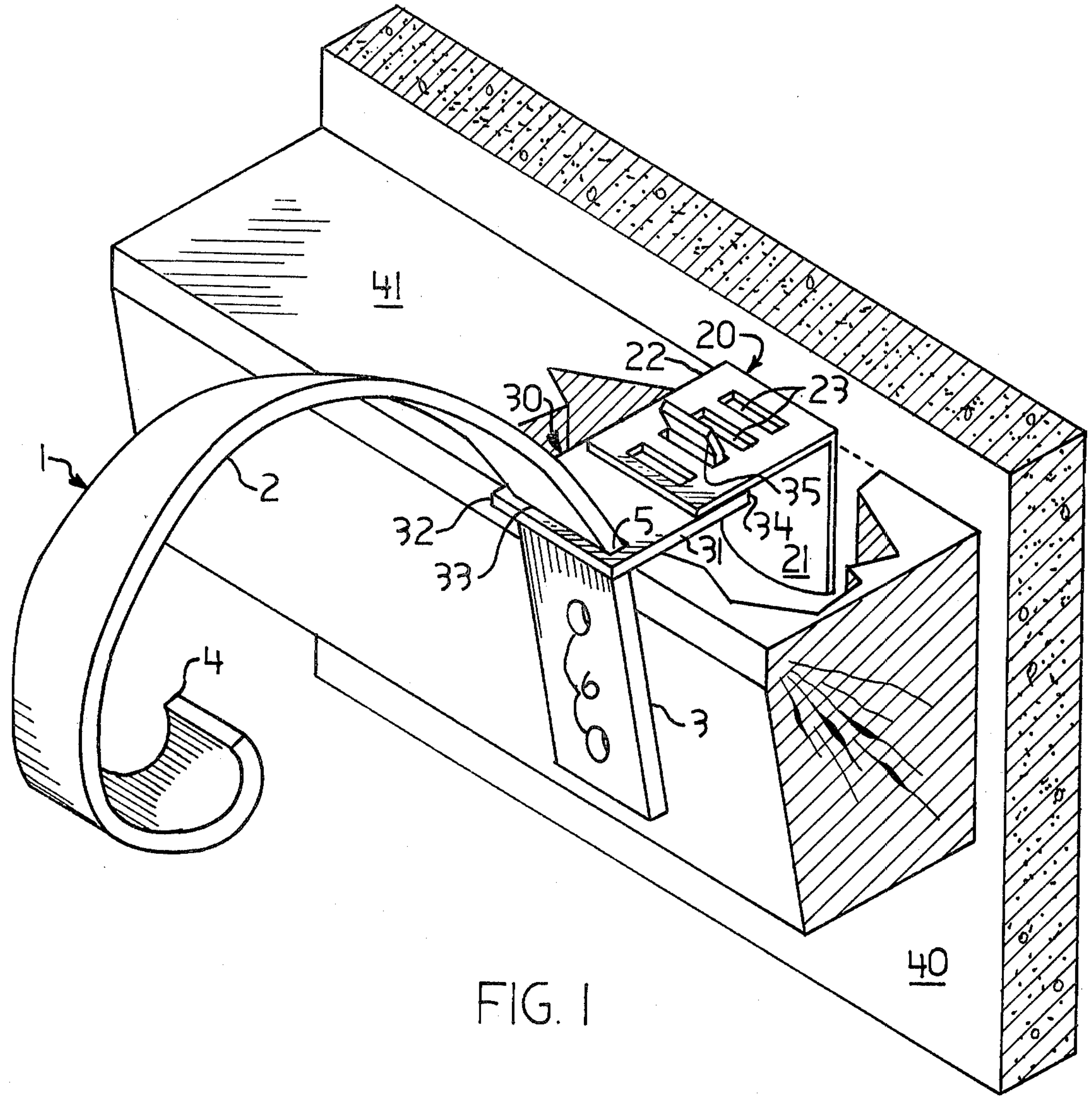

Referring now to FIG. 1, the wall bracket construction of the invention comprises bracket element 1, tang element 20 and link element 30. Bracket element 1 comprises an upper end portion 2 and a lower end portion 3. Upper end portion 2 is displaced outwardly from the lower end portion 3 and comprises a hook 4 from which an article (not shown) can be suspended. In the particular embodiment of the invention shown in FIG. 1 the lower end portion 3 defines a relatively sharp angle at the juncture 5 thereof with upper end portion 2 and depends substantially vertically therefrom. As will be described in more detail hereinafter, said juncture 5 acts as a stop means. If desired, the lower end portion 3 of bracket element 1 may be provided with one or more apertures 6, thereby to provide means by which the bracket element 1, alone, may be secured to a wall by means of conventional fasteners such as screws or nails.

Tang element 20 comprises a vertically depending tang member 21 and a transverse member 22 extending outwardly and substantially horizontally from the upper end of said tang member 21. As shown, said tang member 21 is sufficiently thin as to be readily insertable into the interface between a wall 40 and the abutting surface of a wall molding 41 affixed to said wall 40. Transverse member 22 of the embodiment shown in FIG. 1 is provided with a plurality of spaced apart apertures 23 along at least a portion of its length, the spacing between said apertures 23 desirably being uniform and desirably being within the range of between 1/16 and ½ inch, center to center.

Link element 30 comprises a transverse member 31 having an outboard end 32 adapted for fixation to the lower end portion 3 of bracket element 1. In the particular embodiment of the invention shown in FIG. 1 said adaptation comprises a slot 33 through said outboard end 32, said slot 33 slidably receiving the lower end portion 3 of bracket element 1 therethrough. The shoulder defined by juncture 5 of the upper and lower end portions 2 and 3, respectively, of bracket element 1 serves as a convenient and readily fabricated stop means to prevent penetration of the upper end portion 2 of bracket element 1 into the receiving slot means 33 of transverse link element 30. Obviously, however, many alternative suitable stop means, such as welded or riveted protuberances or collars secured at an appropriate location along the length of bracket element 1, will suggest themselves to those of skill in the art. The inboard end 34 of the transverse member 31 shown in FIG. 1 comprises an upturned projection or hook element 35 adapted to be received by any of the apertures 23 of the transverse member 22 of tang element 20. As can be readily noted from FIG. 1, by appropriate selection of the aperture 23 utilized to receive said projection or hook element 35, the spacing between tang member 21 and the lower end portion 3 of bracket element 1 can be adjusted so as to provide a nicety of fit with respect to the width of the wall molding 41. As can also be readily noted and appreciated, upon suspension of an article from the hook 4 of upper end portion 2 of bracket element 1, the assembly of said bracket element 1, link element 30 and tang element 20 is placed in tension, thereby assuring the security of the interlocking engagements between the various elements of the construction.

Figure 2:
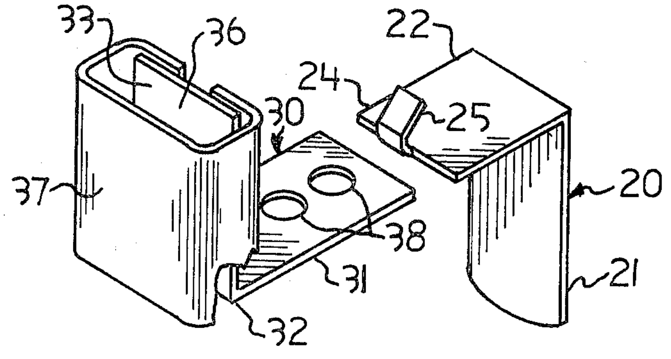

In FIG. 2 hereof there are depicted certain alternative embodiments in respect of tang and link elements 20 and 30. Therein, tang element 20 again comprises a vertically depending tang member 21 and a transverse member 22 extending outwardly from the upper end of said tang member 21. Unlike the embodiment shown in FIG. 1, however, the transverse member 22 of the tang element 20 shown in FIG. 2 does not comprise a plurality of apertures therethrough. Rather, the outboard end 24 thereof carries an upturned projection or hook element 25. The transverse member 31 of link element 30, in this embodiment, does not comprise an upturned hook element at the inboard end thereof. Rather, said transverse member 31 comprises a plurality of spaced apart apertures 38 running along at least a portion of the length thereof, each of said apertures 38 being adapted to receive the projection or hook element 25 of tang element 20 in interlocking relationship therewith. Also, the link element 30 of FIG. 2 comprises a vertical member 36 extending from the outboard end 32 of the transverse member 31, said vertical member 36 preferably, although not necessarily, being upwardly oriented. Slot means 33, which receives the lower end portion 3 of bracket element 1 therethrough, is defined by a collar 37 which circumscribes said vertical member 36 and which collar 37 may be integral with or permanently or slidably affixed to either said vertical member 36 or to said lower portion 3 of bracket element 1.

Figure 3:
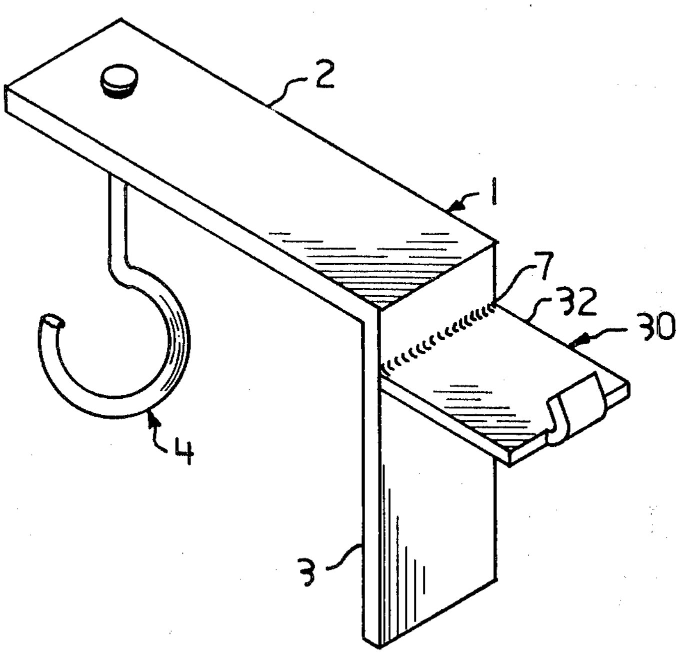

In the embodiment of the invention shown in FIG. 3, the hook 4 is disclosed to be rotatably affixed to the upper end portion 2 of bracket element 1. Moreover, the means by which the outboard end portion 32 of link element 30 is affixed to the lower end portion 3 of bracket element 1 is shown to comprise a simple weldment 7.

Figure 4:
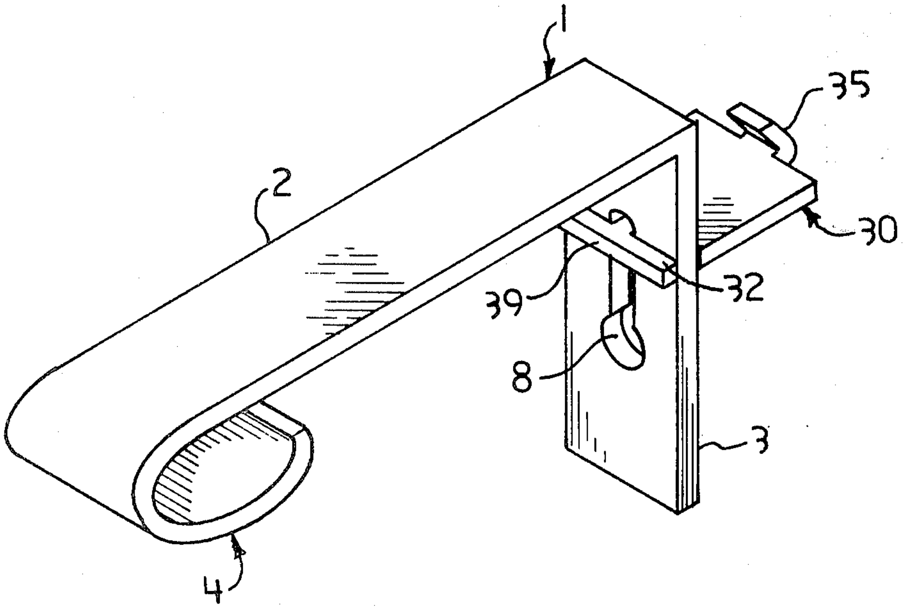

In the embodiment of the invention shown in FIG. 4 there is disclosed alternative means by which the outboard end portion 32 of link element 30 is attached to the lower end portion 3 of bracket element 1. Said lower end portion 3 comprises a vertically oriented keyway 8 therethrough. Said end portion 32 is formed so as to define a T-shaped key 39 which is dimensioned so as to fit through keyway 8 when aligned therewith and to be firmly captured therein when link element 30 is rotated 90° so as to orient the hook element 35 thereof upwardly.

As will be appreciated, the various elements of the construction of the present invention can be readily fabricated from various metallic sheet and/or strap materials such as aluminum or steel. Moreover, the forming operations utilized are entirely conventional in the metal-working art. Too, various polymers can also be found to be entirely suitable for use in the construction of one or more of the elements of the invention.

Obviously, therefore, many changes, modifications and alterations may be made in the above description without departing from the essential spirit and scope of the invention. Accordingly, it is intended, and it should be so understood, that the foregoing description is to be regarded as illustrative of the principles of the invention, the cooperative relationships of the elements thereof and of certain preferred embodiments, and not in a limiting sense.

The embodiments of the invention in which an exclusive property or privilege is claimed are defined as follows:

1. A wall bracket construction comprising:

an elongate bracket element having upper and lower end portions, said upper end portion being outwardly displaced from said lower end portion and having a hook for suspending an article therefrom;

a tang element comprising a vertical, downwardly oriented, tag member adapted to be inserted into the interface between a wall and wall molding affixed to said wall and a first transverse member extending outwardly and substantially horizontally from the upper end of said tang member;

a link element comprising a second transverse member, the outboard end of said second transverse member comprising slot means to receive the lower end portion of said bracket element;

one of said first or second transverse members comprising a plurality of spaced apart apertures therethrough along at least a portion of the length thereof and the other of said first or second transverse members having at least one upturned projection adapted to engage any of said apertures of said one transverse member in interlocking relationship therewith, said bracket element further comprising stop means to prevent entry of said upper end portion thereof in said slot means of said link element.

2. The construction of claim 1 wherein said transverse member of said tang element comprises said plurality of apertures.

3. The construction of claim 1 wherein said transverse member of said link element comprises said plurality of apertures.

4. The construction of claim 1 wherein said apertures are uniformly spaced.

5. The construction of claim 4 wherein said uniform spacing is within the range of between 1/16 and ¼ inch, center to center.

6. The construction of claim 1 wherein, in addition, said lower end portion of said bracket element comprises at least one aperture to receive a fastener therethrough.

7. The construction of claim 1 wherein said link element comprises a vertical member extending from the outboard end of said transverse member and wherein said slot means is defined by a collar circumscribing said vertical member.

8. The construction of claim 7 wherein said vertical member is oriented upwardly and said collar is slideably engaged therewith.

9. The construction of claim 1 wherein said stop means comprises an abruptly angled juncture between said upper and lower end portions of said bracket means.

10. The construction of claim 1 wherein said means for fixation of said outboard end of said link element to said lower end portion of said bracket element comprises a keyway through said lower end portion of said bracket element and a corresponding key formed in said outboard end of said link element.

11. The construction of claim 1 wherein said means for fixation of said outboard end of said link element to said lower end portion of said bracket element comprises a weldment therebetween.

* * * * *